United States Patent [19]

Calderoni et al.

[11] 4,313,315
[45] Feb. 2, 1982

[54] COMPRESSOR REFRIGERATION CIRCUITS

[75] Inventors: Gabriele Calderoni, Varese; Gian A. Gavina, Pavia, both of Italy

[73] Assignee: U.S. Philips Corporation, New York, N.Y.

[21] Appl. No.: 122,082

[22] Filed: Feb. 19, 1980

[51] Int. Cl.³ .............................................. F25B 43/04
[52] U.S. Cl. ........................................ 62/475; 62/509; 62/513
[58] Field of Search ................. 62/474, 475, 513, 113, 62/509

[56] References Cited

U.S. PATENT DOCUMENTS

| | | | |
|---|---|---|---|
| 2,448,315 | 8/1948 | Kunzog | 62/511 |
| 2,505,393 | 4/1950 | Garner | 62/474 |
| 2,505,934 | 5/1950 | Aughey et al. | 62/474 |
| 2,577,834 | 12/1951 | Wenk | 62/474 |
| 3,084,523 | 4/1963 | Bottum et al. | 62/474 |
| 3,119,244 | 1/1964 | Fabian | 62/474 |

Primary Examiner—Ronald C. Capossela
Attorney, Agent, or Firm—Thomas A. Briody; William J. Streeter; Rolf E. Schneider

[57] ABSTRACT

A closed refrigeration circuit comprises in series a compressor, a condenser, a drier-filter, a capillary tube, an evaporator, and a conduit connecting the evaporator to the condenser and traversing the drier-filter. A refrigerant fluid circulates in operation through the circuit. With this arrangement the connecting conduit is in heat-exchanging relationship with the drier-filter, thereby avoiding the need for a separate heat exchanger.

5 Claims, 1 Drawing Figure

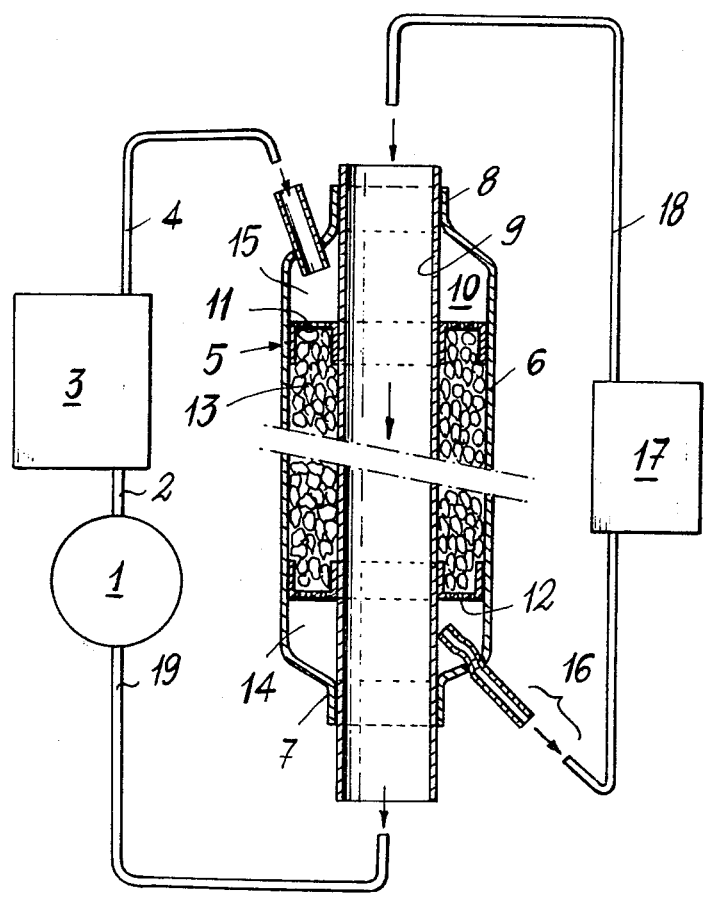

COMPRESSOR REFRIGERATION CIRCUITS

This invention relates to a refrigeration circuit comprising a compressor, a condenser, a drier-filter, a capillary tube, an evaporator and a refrigerant fluid circulating in operation around said circuit.

In a conventional closed refrigeration circuit, the drier-filter is connected between the condenser and the capillary tube, and the refrigerant fluid flowing through the latter is cooled, to increase the thermodynamic efficiency of the circuit, by subjecting it to heat transfer with the refrigerant fluid which has left the evaporator in a still cold condition and is returning to the compressor through a return pipe. There are various practical systems used for effecting this heat transfer. In one system, the capillary tube extends over a certain distance inside the return pipe, and is consequently cooled directly by the refrigerant fluid. In a second system, the capillary tube is tightly wound around the return pipe over a substantial distance, and in a third system the capillary tube extends partly within an axial groove in the return pipe.

Each of these systems is relatively complicated and therefore costly.

In U.S. Pat. No. 2,448,315, the refrigerant fluid is cooled before it reaches the evaporator by using a special heat exchanger connected between the condenser and the drier-filter. This system dispenses with the constructional complications of the above-described systems, but requires the connection into the refrigeration circuit of a further component of substantial overall size (in that it incorporates a sintered mass), so as to preclude the use of this refrigeration circuit in those refrigeration appliances, especially domestic appliances, where the space available for the circuit is very limited. In addition, the cost of the heat exchanger and its connection into the circuit is equal to or greater than the cost of any of the above-described systems.

The object of the present invention is to cool the refrigerant fluid flowing to the evaporator by means of the refrigerant fluid leaving the latter, by the use of a member which also performs a further function in the refrigeration circuit, so that the complications of the use of a special heat exchanger as in the prior art are avoided.

A further object of the present invention is to simultaneously improve the drying action on the refrigerant fluid.

According to the invention, there is provided a refrigeration circuit or system comprising a compressor, a condenser, a drier-filter, a capillary tube, and evaporator and a refrigerant fluid circulating in operation around the circuit, wherein the drier-filter is traversed by a conduit which conveys the refrigerant fluid leaving the evaporator, so that the drier-filter also acts as a heat exchanger.

According to a preferred embodiment of the invention, the drier-filter is disposed vertically.

According to a further embodiment of the invention, the drier-filter includes a jacket which with the conduit defines an interspace which is respectively connected to the condenser and the capillary tube, and in which a drying material is disposed.

The invention will now be further described with reference to the accompanying drawing, in which the single FIGURE diagrammatically illustrates a refrigeration circuit incorporating the device which acts as a heat exchanger and a drier-filter, such device being shown in axial cross-section.

The circuit includes a conventional compressor 1, the delivery side of which is connected to the inlet of a condenser 3 by means of the pipe 2. The outlet of the condenser is connected by a pipe 4 to a device 5 which is disposed vertically and simultaneously acts as a drier-filter and a heat exchanger. In this embodiment, the device 5 comprises an outer jacket 6 closed at its ends 7, 8 and disposed over an inner conduit 9 with which the jacket forms an interspace 10 divided into three separate intercommunicating zones 15, 13 and 14 by a pair of perforated or otherwise permeable baffles 11, 12. A charge of a drying-filtering, material, consisting of molecular sieves is disposed in the intermediate zone 13.

The end of the pipe 4 passes through the jacket 6 in proximity to its upper end, to open into the zone 15 of the interspace, and is fixed to the jacket, for example by welding.

A capillary tube 16 opens into the zone 14 of the interspace, and its end is fixed to the jacket 6, for example by welding.

The capillary tube 16 is connected to the inlet of an evaporator 17, the outlet of which is connected to the suction side of the compressor 1 through a return pipe 18, 19 and the conduit 9. In a different embodiment, this conduit could form part of the return pipe itself, the jacket 6 being directly fixed to the latter.

In operation, the refrigerant fluid moves through the refrigeration circuit in the direction of the arrows.

The refrigerant fluid, which leaves the condenser 3 still in a hot condition, enters the device 5 where it is dried by contact with the molecular sieves in the zone 13, and is cooled by the still fairly cold refrigerant fluid leaving the evaporator 17 through the portion 18 of the return pipe and flowing concurrently through the conduit 9 to return to the compressor 1 through the other portion 19 of the return pipe. The molecular sieves are also cooled, and this increases their drying power.

The described arrangement ensures that when the refrigerant fluid enters the capillary tube 16, it is still totally in the liquid state, thus providing considerable thermodynamic advantages. As the hotter fluid is on the outside of the colder fluid in the device 5, there is the further advantage that it is no longer necessary to insulate the device, or (as done up to the present time) the return pipe 18, 19. After flowing through the interspace 10, the refrigerant fluid leaves the device 5 through the capillary tube 16, expands in the evaporator 17, leaves the latter in a still fairly cold state, and before its return to the compressor 1 is utilised in the device 5 for cooling the still hot refrigerant fluid from the condenser 3, as already described.

What is claimed is:

1. A closed refrigeration circuit which comprises in series a compressor, a condenser, a drier-filter containing a drying-filtering material, a capillary tube, an evaporator, a conduit connecting the evaporator to the condenser and traversing the drier-filter, and a refrigerant fluid for circulation in operation through said series-arranged elements, said drier-filter thereby also serving as a heat exchanger.

2. A refrigeration circuit according to claim 1, in which the drier-filter is disposed vertically.

3. A refrigeration circuit according to claim 2, in which the drier-filter includes a jacket forming an interspace with the conduit, said interspace being connected at one end to the condenser and at its other end to the capillary tube.

4. A refrigeration circuit according to claim 3, in which the one end of the interspace is its upper end.

5. A refrigeration circuit according to claim 3 or 4, in which the conduit and the interspace are arranged for concurrent flow of the refrigerant fluid respectively therethrough.

* * * * *